United States Patent [19]

Murayama et al.

[11] 4,386,360

[45] May 31, 1983

[54] HEAT-SENSITIVE RECORDING HEAD

[75] Inventors: Tomio Murayama; Haruhiko Moriguchi; Fujio Moriguchi; Takashi Ohmori, all of Kanagawa, Japan

[73] Assignee: Fuji Xerox Co., Ltd., Tokyo, Japan

[21] Appl. No.: 296,935

[22] Filed: Aug. 28, 1981

[30] Foreign Application Priority Data

Sep. 1, 1980 [JP] Japan ............................... 55-119717

[51] Int. Cl.$^3$ ............................................ G01D 15/10

[52] U.S. Cl. ............................................... 346/76 PH

[58] Field of Search .................... 346/76 PH; 400/120

[56] References Cited

U.S. PATENT DOCUMENTS 3,453,647 7/1969 Bernstein et al. ............. 346/76 PH

FOREIGN PATENT DOCUMENTS 56-82281 7/1981 Japan ............................. 346/76 PH

*Primary Examiner*—Donald A. Griffin

*Attorney, Agent, or Firm*—Sughrue, Mion, Zinn, Macpeak and Seas

[57] ABSTRACT

A heat-sensitive recording head having heat generating elements arranged on an insulating substrate and a system for preheating said substrate and controlling the heat generated during the recording operation. In one embodiment the substrate is placed in contact with a larger heat sink which is heated by a carbon-type internal resistor, a printed circuit contacting resistor, or a conventional heater. A thermal sensor detects the temperature of the heat sink and is fed to controls for controlling the overall application of heat. In another embodiment the substrate is placed in contact with a Peltier effect device which controls heat generation and absorption.

10 Claims, 6 Drawing Figures

HEAT-SENSITIVE RECORDING HEAD

BACKGROUND OF THE INVENTION

This invention relates to a heat-sensitive recording head employed for a facsimile system, a printer or the like.

The formation of images by a heat-sensitive recording method has various merits. However, since an image is recorded by transmitting thermal energy from the recording head to the recording sheet, a relatively long time is needed until coloring is effected after a video signal is applied.

The coloring time may be shortened by increasing the amplitude of a pulse applied to the recording head. However, in that case an excessively high voltage is employed, and therefore the service life of the recording head may be reduced. Furthermore, for the same reason, the electrical insulation of the recording head must be considerably high, which results in an increase in manufacturing cost and an increase in size.

In addition, the heat-sensitive recording method is disadvantageous in that as a larger part of the thermal energy is absorbed by components around the heat generating head before being transmitted to the recording sheet at the start of the recording operation, the density of the recorded image is insufficient.

SUMMARY OF THE INVENTION

Accordingly, an object of this invention is to provide a heat-sensitive recording head in which all of the above-described difficulties accompanying a conventional heat-sensitive recording method have been eliminated.

In order to achieve the foregoing object, a heat sink is set in contact with an insulating substrate bearing heat generating elements, and the temperature of the heat sink is controlled independently of the heat generating elements.

DETAILED DESCRIPTION OF THE PREFERRED EMBODIMENTS

Figure 1:
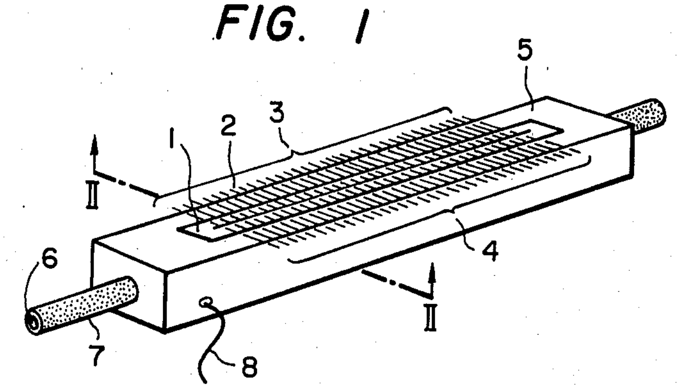
FIG. 1 is a perspective view of one example of a recording head according to this invention.
Figure 2:
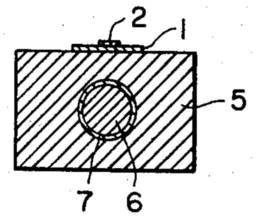
FIG. 2 is an enlarged sectional view taken along line II—II in FIG. 1.

Referring to FIGS. 1 and 2, reference numeral 1 designates an insulating substrate of ceramic or the like for heat generating elements 2; 3 and 4, leads for applying electrical energy to the heat generating elements 2; 5, a heat sink made of metal such as aluminum; 6, a heat generating resistor essentially containing carbon in combination, and penetrating the heat sink 5; 7, an insulating film for insulating the heat generating resistor 6 from the heat sink 5; and 8, a lead line extending from a temperature sensor built in the heat sink 5.

In the case of a heat-sensitive recording operation carried out with the recording head thus constructed, current is applied to the heat generating resistor 6 to the extent that the recording medium is not colored, whereby the temperature of the substrate 1 is increased in advance. This temperature control is carried out by utilizing a temperature signal outputted through the lead 8.

If the recording head is preheated as described above, then the amount of electrical energy applied through the leads 3 and 4 to the heat generating elements 2 is smaller than that required if the recording head is not heated in advance.

If the recording head of the invention is employed for facsimile communication or the like, the recording head is preheated in response to a protocol signal which is transmitted prior to a video signal, then a sufficient coloring density can be obtained as soon as the recording operation is started.

Not only is the diffusion of heat from the heat generating resistor 6 to the heat sink 5 detected by the signal on thermal sensor lead 8, but also the temperature variation due to the diffusion of heat from the heat generating elements 2 to the heat sink 5 is so detected. Therefore, the signal on lead line 8 can be utilized as a temperature compensating signal during the entire recording operation to maintain the recorded image constant in density.

Figure 3:
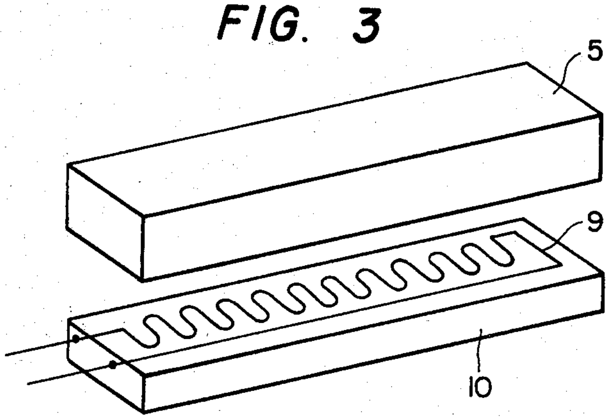
FIGS. 3 through 5 are perspective views showing the essential components of other examples of the recording head of the invention.

FIG. 3 is a perspective view showing the essential components of a second example of the recording head according to the invention. In FIG. 3, reference numeral 10 designates an insulating substrate made of ceramic or the like; and 9, a heat generating resistor which is formed by printing metal resistance paste on the substrate 10. The substrate 10 and the heat generating resistor 9 form a preheating section.

If the preheating section thus constructed is brought into contact with one surface of a heat sink 5 on the opposite surface of which a substrate and heat generating elements are provided similarly as in FIG. 1, then the same effect as that in the first example can be obtained.

Figure 4:
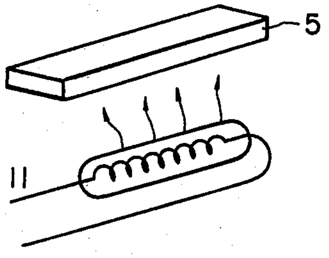

FIG. 4 is a perspective view showing the essential components of a third example of the recording head according to the invention. A heater 11 is provided below a heat sink 5 to heat the entire heat sink 5. It is obvious that the third example can also obtain the same effect as that of the first example shown in FIG. 1.

Figure 5:
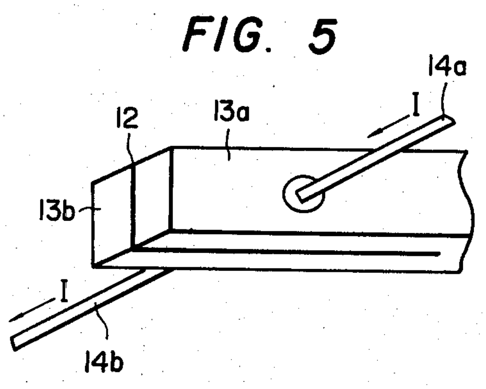

FIG. 5 is a perspective view showing the essential components of a fourth example of the recording head according to the invention. In FIG. 5, reference numeral 12 designates an n-type semiconductor layer having the Peltier effect; 13*a* and 13*b*, metal plates placed on both sides of the semiconductor layer 12 in the form of a sandwich; and 14*a* and 14*b*, leads connected to the metal plates 13*a* and 13*b*, respectively.

As is well known in the art, when a current is passed through the junctions of the semiconductor 12 and the metal plates 13 over the leads 14*a* and 14*b*, the amount of heat which is determined from the product of the current and the Peltier coefficient is produced or absorbed depending on whether the current flows in one direction or in the opposite direction. Therefore, the fourth example can be employed as a heating unit by suitably selecting the direction of flow of the current.

Thus, it is obvious that the heating unit in FIG. 5 can be used in place of the heat sink 5 and the heat generating resistor 6 in FIG. 1 or the preheating section in FIG. 3.

If, in the heating unit in FIG. 5, the direction of flow of the current applied through the leads 14*a* and 14*b* is reversed, then the unit works as a cooling unit. Therefore, if both the magnitude and direction of the current are controlled then the preheating and temperature control of the heat sink and/or the heat generating element can be achieved more accurately and quickly, which makes it possible to increase the recording speed.

It is obvious that the same effect or function can be obtained by using two different metals having the Peltier effect instead of the above-described semiconductor and metal.

Figure 6:
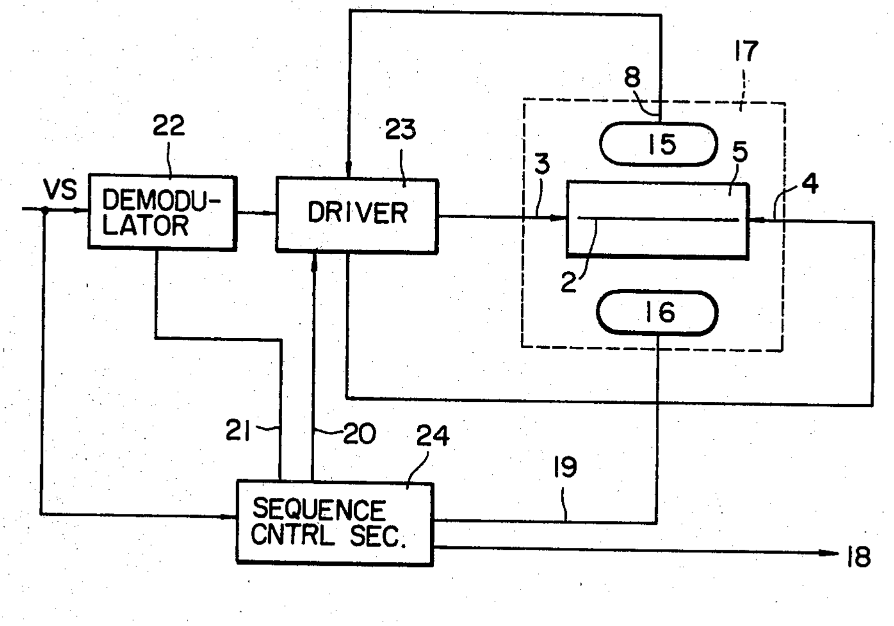
FIG. 6 is a block diagram of a facsimile recording section to which the recording head of the invention is applied.

One application of the novel heat-sensitive recording head to a facsimile recording section will be described with reference to FIG. 6. FIG. 6 is a block diagram showing the facsimile recording section. A received signal VS is converted into a video signal by a demodulator 22. The video signal is applied to a driver 23, the output of which excites the heat generating elements of a recording head 17 according to a timing signal 20 from a sequence control section 24.

In this operation, energy applied to the recording head 17 is controlled by controlling the width or amplitude of the exciting pulse according to a detection value from a thermal sensor 15, whereby an image of uniform density can be recorded.

Simultaneously when the signal VS is received, a heating instruction signal (for specifying the magnitude and/or direction of the current) 19 is applied to a preheating mechanism 16 by the sequence control sections 24, to heat the entire head until the temperature signal from the thermal sensor 15 reaches a predetermined value. In this case, the amount of energy applied to the heat generating element 2 from the driver 23 is reduced, and the burden of the driver 23 and the heat generating element 2 are decreased.

By providing a preheating function to the recording head as described above various advantages are achieved. The recording period can be shortened, the service life of the heating generating unit is increased and an image of sufficient density can be recorded from the start of the recording operation. The utilization of the heating unit in FIG. 5 can increase the recording speed.

What is claimed is:

1. A heat-sensitive recording head for recording an image on a recording sheet, having heat generating elements arranged on an insulating substrate, comprising:

a heat sink positioned in operative relation to said heat generating elements through said insulating substrate; and means for controlling the temperature of said heat sink independently of said heat generating elements, comprising a means for heating said heat sink and a means for sensing the temperature of said heat sink and producing a signal indicative thereof.

2. A heat-sensitive recording head as claimed in claim 1 wherein said insulating substrate is positioned on said heat sink, and said means for sensing the temperature of said heat sink monitors the temperature of said heat generating elements.

3. A heat-sensitive recording head as claimed in claim 2 wherein said means for heating comprises a resistor extending through said heat sink.

4. A heat-sensitive recording head as claimed in claim 3 wherein said resistor consists essentially of carbon in combination.

5. A heat-sensitive recording head as claimed in claim 2 wherein said means for heating comprises a second insulating substrate and a printed circuit heat generating resistor on said substrate, said substrate and heat generating printed circuit resistor being in contact with at least one surface of said heat sink.

6. A heat-sensitive recording head as claimed in claim 2 wherein said means for heating comprises a heater positioned outside of and out of contact with said heat sink.

7. A heat sensitive recording head as claimed in any of claims 1–6 wherein said heat sink is aluminum.

8. A heat-sensitive recording head having heat generating elements arranged on an insulating substrate, comprising:

Peltier effect means in juxtaposition with said insulating substrate, and control means for controlling the heat generation/absorption amount of said Peltier effect means to preheat said recording head prior to application of printing signals to heat generating elements and to provide heat control of said recording head throughout said recording operation.

9. A heat-sensitive recording head as claimed in claim 8 wherein said Peltier effect means comprises a pair of metal layers with a Peltier effect semiconductor sandwiched therebetween, and wherein said control means comprises electrical current conductors connected to said pair of metal layers for passing current between said metal layers through said semiconductor.

10. A heat sensitive recording head as claimed in claim 9 wherein said control means comprises means for controlling the direction of current through said current conductors.

* * * * *